No. 652,348. Patented June 26, 1900.
W. I. CRAWFORD.
STAIR TREAD.
(Application filed Nov. 9, 1899.)
(No Model.)
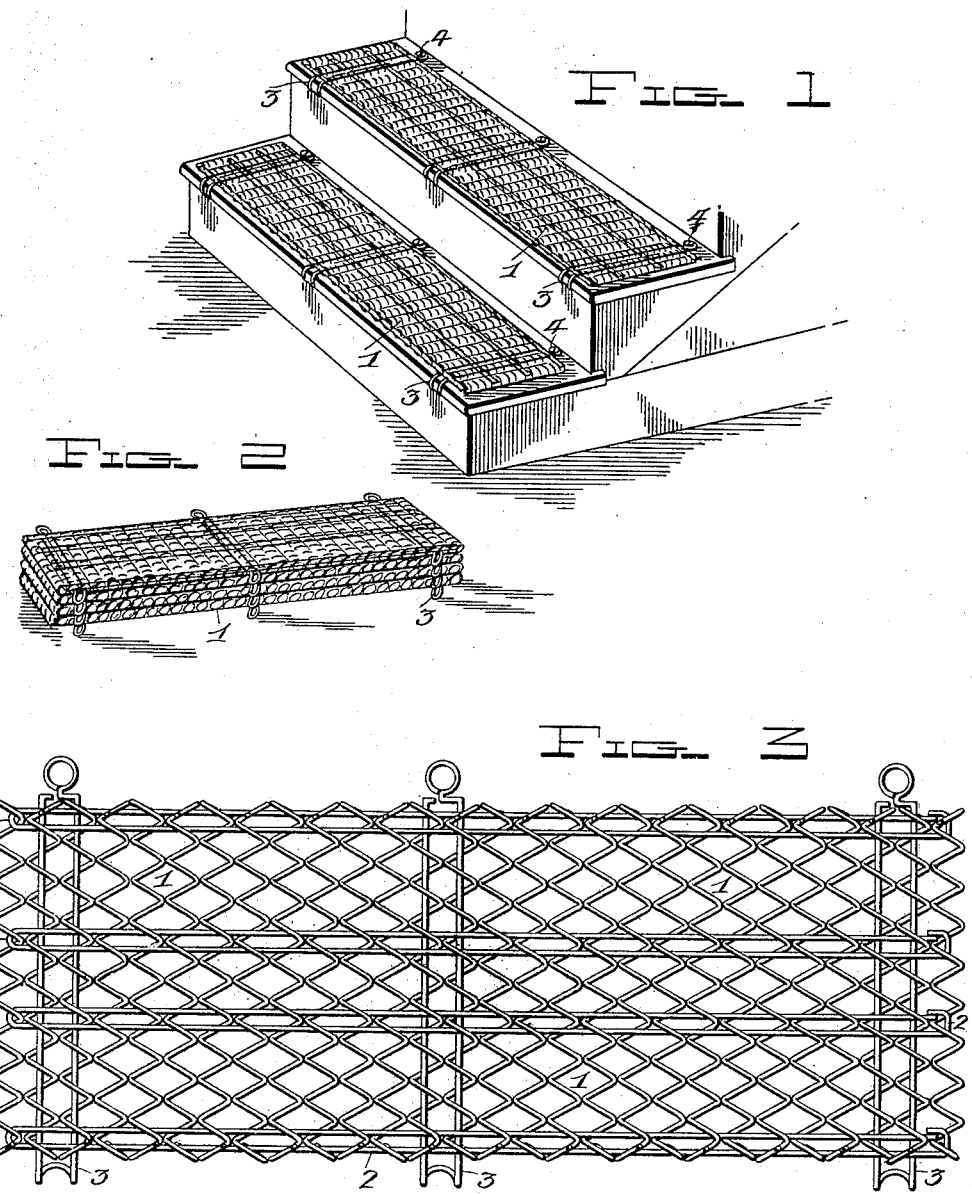
Witnesses
Inventor
W. I. Crawford,
by
Attorneys
THE NORRIS PETERS CO., PHOTO-LITHO., WASHINGTON, D. C.

United States Patent Office.

WILLIAM I. CRAWFORD, OF SHARPSVILLE, PENNSYLVANIA.

STAIR-TREAD.

SPECIFICATION forming part of Letters Patent No. 652,348, dated June 26, 1900.

Application filed November 9, 1899. Serial No. 736,409. (No model.)

*To all whom it may concern:*

Be it known that I, WILLIAM I. CRAWFORD, a citizen of the United States, residing at Sharpsville, in the county of Mercer and State of Pennsylvania, have invented certain new and useful Improvements in Stair-Treads; and I do declare the following to be a full, clear, and exact description of the invention, such as will enable others skilled in the art to which it appertains to make and use the same.

The invention relates to stair-treads.

The object of the invention is to provide a stair-tread which shall be simple of construction, durable in use, and comparatively inexpensive of production, which will form practically a noiseless tread in ascending or descending the stairs, and will always present a clean surface.

To this end the invention consists in certain features of construction and combination of parts, which will be hereinafter fully described and claimed.

In the accompanying drawings, Figure 1 is a perspective view illustrating my invention applied to a flight of stairs. Fig. 2 is a similar view showing the treads stacked when off the steps. Fig. 3 is an enlarged top plan view.

In the drawings the same reference characters indicate the same parts of the invention.

1 denotes a series of transversely-arranged coiled wires which may or may not be interlocked.

2 denotes stiff rods extending through the end and central coils of the transverse wires. These rods double upon themselves, as shown. One of the ends of each of the rods is longer than the other end and is bent around the same to form a neat and strong joint.

3 denotes transverse securing-rods which extend transversely through the coils and are doubled upon themselves. The bights of these rods are bent downwardly to hook under the edge of the tread of the step, while the other ends of these rods are formed with eyes to engage headless screws 4 or other appliances, secured in the tread of the step near its rear edge.

A tread of this construction may be made at small cost and may be easily and quickly applied to and removed from steps. When in use, it forms practically a noiseless tread and always presents a clean surface, as dirt and foreign matter will be caught by and sifted through the wire tread onto the tread of the step and may be easily and quickly swept therefrom by removing the wire tread.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

1. A wire stair-tread comprising the transverse rows of coiled wires connected together, and transverse securing-rods extending transversely through said coiled wires, and provided with means for fastening the device in position, substantially as and for the purpose set forth.

2. A wire stair-tread comprising transverse coiled wires, longitudinal rods doubled upon themselves and passed longitudinally through the coils of said wires and having their ends secured together, and transverse securing-wires extending transversely through the coiled wires and provided with a hook at one end and an eye at the other to secure the tread in position, substantially as and for the purpose set forth.

In testimony whereof I have hereunto set my hand in presence of two subscribing witnesses.

WILLIAM I. CRAWFORD.

Witnesses:
 BENJ. G. COWL,
 EMMA M. GILLETT.